United States Patent
Goyal et al.

(10) Patent No.: US 12,547,624 B2
(45) Date of Patent: Feb. 10, 2026

(54) SYSTEMS AND METHODS FOR DEMOCRATIZING SENSITIVE DATA

(71) Applicant: Goldman, Sachs & Co. LLC, New York, NY (US)

(72) Inventors: Sanyam Goyal, Bengaluru (IN); Anil Grover, Bengaluru (IN); Sumit K. Rastogi, Bengaluru (IN)

(73) Assignee: Goldman, Sachs & Co., LLC, New York, NY (US)

( * ) Notice: Subject to any disclaimer, the term of this patent is extended or adjusted under 35 U.S.C. 154(b) by 0 days.

(21) Appl. No.: 18/187,339

(22) Filed: Mar. 21, 2023

(65) Prior Publication Data

US 2024/0320217 A1    Sep. 26, 2024

(51) Int. Cl.
*G06F 7/00* (2006.01)
*G06F 9/54* (2006.01)
*G06F 16/2453* (2019.01)

(52) U.S. Cl.
CPC ........ *G06F 16/24544* (2019.01); *G06F 9/542* (2013.01)

(58) Field of Classification Search
CPC .................. G06F 16/24544; G06F 9/542
See application file for complete search history.

(56) References Cited

U.S. PATENT DOCUMENTS

| | | | | |
|---|---|---|---|---|
| 8,656,181 B2* | 2/2014 | Balinsky | ................... | H04L 9/14 713/165 |
| 10,803,082 B1* | 10/2020 | Chu | ................... | G06F 16/2456 |
| 12,086,295 B2* | 9/2024 | Auh | ................... | H04L 9/14 |
| 2004/0167911 A1* | 8/2004 | Wakefield | ................... | G06F 16/313 |
| 2006/0143194 A1* | 6/2006 | Stewart | ................... | G06Q 10/06 |
| 2007/0112798 A1* | 5/2007 | Polk | ................... | G06F 21/6218 |
| 2008/0288889 A1* | 11/2008 | Hunt | ................... | G06Q 30/02 715/810 |

(Continued)

FOREIGN PATENT DOCUMENTS

| CN | 108763960 A | 11/2018 |
|---|---|---|
| CN | 109409119 A | 3/2019 |
| CN | 111400170 A | 7/2020 |

OTHER PUBLICATIONS

PCT Search Report and Written Opinion corresponding to PCT Application No. PCT/US2024/020638, mailed Jul. 9, 2024, 10 pages.

*Primary Examiner* — Mohammed R Uddin
(74) *Attorney, Agent, or Firm* — Baker Botts L.L.P.

(57) ABSTRACT

In one embodiment, a method includes obtaining datasets from one or more applications. The datasets comprise functional data and control data related to a plurality of events. The method also includes defining a functional table using the functional data and defining a control table using the control data. The method further includes joining the functional table and the control table to generate an entitlement table. In another embodiment, a method includes receiving a request from a user to access sensitive data related to an event. The method also includes identifying a role of the user and identifying a role-based entitlement of the user based on the role of the user. The method also includes determining, using the role-based entitlement of the user, a user entitlement. The method further includes generating a secured view associated with the user entitlement and communicating the secured view to the user.

18 Claims, 5 Drawing Sheets

(56) References Cited

U.S. PATENT DOCUMENTS

| | | | |
|---|---|---|---|
| 2008/0295147 A1 | 11/2008 | Chang et al. | |
| 2009/0187440 A1* | 7/2009 | Sreevas | G06Q 10/00 |
| | | | 705/75 |
| 2009/0254971 A1* | 10/2009 | Herz | G06Q 10/10 |
| | | | 726/1 |
| 2009/0328132 A1* | 12/2009 | Renfro | G06F 21/577 |
| | | | 726/4 |
| 2013/0318589 A1* | 11/2013 | Ford | H04L 63/10 |
| | | | 726/7 |
| 2014/0143889 A1* | 5/2014 | Ginter | G06F 21/87 |
| | | | 726/27 |
| 2014/0189818 A1* | 7/2014 | Meyer | H04L 51/08 |
| | | | 726/4 |
| 2016/0350525 A1* | 12/2016 | Jiang | G06F 9/445 |
| 2017/0041296 A1* | 2/2017 | Ford | G06F 21/64 |
| 2018/0285544 A1 | 10/2018 | Chang et al. | |
| 2018/0314603 A1* | 11/2018 | Gibbons, Jr. | H04L 67/1097 |
| 2020/0110838 A1* | 4/2020 | Pasha | G06N 7/01 |
| 2021/0104304 A1* | 4/2021 | Davidovics | H04W 12/08 |
| 2021/0141838 A1* | 5/2021 | Atallah | G06F 16/90332 |
| 2022/0397809 A1* | 12/2022 | Talpade | H04N 23/51 |
| 2024/0097999 A1* | 3/2024 | Sun | G06N 5/01 |
| 2024/0119045 A1* | 4/2024 | Aggarwal | G06F 16/2456 |
| 2024/0193288 A1* | 6/2024 | Hildenbrand | G06F 16/24558 |
| 2024/0303373 A1* | 9/2024 | Bijon | G06F 16/244 |

* cited by examiner

| Role-Based Control Table 154c | | | | | |
|---|---|---|---|---|---|
| Users 192 | Roles 320 | Divisions 310 | Business Lines 420 | Event IDs 430 | Geographical Indicators 440 |
| 192a | Firmware Reader 320a | | | | |
| 192b | Operational Risk Reader 320b | | | | |
| 192c | Operational Risk Sensitive 320c | | | | |
| 192d | Operational Risk 320d | | | | |
| 192e | Divisional Reviewer 320e | 310a | 420a | | |
| 192f | Divisional Reviewer 320e | 310b | | | |
| 192g | Named Role 320f | | | 430a | |

*FIG. 4*

| Event-Based Control Table 154d | | | | | |
|---|---|---|---|---|---|
| Event IDs 430 | Divisions 310 | Business Lines 420 | Geographical Indicators 440 | Sensitive Data Indicators 510 | Sensitive Data Flag Indicators 520 |
| 430b | 310c | | | | |
| 430b | 310c | 420b | | | |
| 430c | 310d | 420c | | | |
| 430c | 310a | | | | |
| 430c | 310a | 420c | | | |

SYSTEMS AND METHODS FOR DEMOCRATIZING SENSITIVE DATA

TECHNICAL FIELD

The present disclosure relates generally to communication networks, and more specifically to systems and methods for democratizing sensitive data.

BACKGROUND

Certain institutions handle highly sensitive data such as customer positions, firm positions, material non-public information (MNPI), personally identifiable information (PII), etc. Institutions may have regulatory obligations to safeguard such sensitive data. Divisions such as global market divisions, equities teams, and non-financial risk (NFR) teams may manage their own sensitive data. Compromising such sensitive data can lead to financial or reputational loss.

DESCRIPTION OF EXAMPLE EMBODIMENTS

Overview

According to a first embodiment, a network element includes one or more processors and one or more computer-readable non-transitory storage media coupled to the one or more processors and including instructions that, when executed by the one or more processors, cause the network element to perform operations. The operations include receiving a request from a user to access sensitive data related to an event. The operations also include identifying a role of the user and identifying a role-based entitlement of the user based on the role of the user. The operations also include determining, using the role-based entitlement of the user, a user entitlement. The operations further include generating a secured view associated with the user entitlement and communicating the secured view to the user.

In accordance with certain embodiments, the operations include subscribing the user to a data lake prior to receiving the request from the user to access the sensitive data related to the event. The user may be associated with a data warehouse. In accordance with some embodiments, communicating the secured view to the user includes copying the secured view from the data lake to the data warehouse.

In accordance with certain embodiments, the role of the user is associated with one of the following roles: an operational risk sensitive role, an operational risk reader role, a firmwide reader role, a business line reader role, and a named role.

In accordance with some embodiments, the role-based entitlement of the user is associated with one of the following role-based entitlements: allowing the user to view all events; allowing the user to view all non-sensitive events; allowing the user to view non-sensitive events related to one or more divisions associated with the user; allowing the user to view non-sensitive events related to one or more divisions and one or more business lines associated with the user; allowing the user to view events having an impact related to one or more divisions associated with the user; and allowing the user to view events that are associated with the user.

In accordance with certain embodiments, the operations include determining an event division associated with the event, determining a user division associated with the user, determining that the event division and the user division are the same, and/or determining, based at least in part on determining that the user division and the event division are the same, the user entitlement.

In accordance with some embodiments, the operations include determining a user geographical location associated with the user, determining an event geographical location associated with the event, determining that the user geographical location matches the event geographical location, and/or determining, based at least in part on determining that the user geographical location matches the event geographical location, the user entitlement.

In accordance with certain embodiments, the operations include determining that the event is classified as sensitive, determining, based on the role-based entitlement, that the user is allowed to view events classified as sensitive, and/or determining, based at least in part on determining that the user is allowed to view the events classified as sensitive, the user entitlement.

According to another first embodiment, a method includes receiving a request from a user to access sensitive data related to an event. The method also includes identifying a role of the user and identifying a role-based entitlement of the user based on the role of the user. The method also includes determining, using the role-based entitlement of the user, a user entitlement. The method further includes generating a secured view associated with the user entitlement and communicating the secured view to the user.

According to yet another first embodiment, one or more computer-readable non-transitory storage media embody instructions that, when executed by a processor, cause the processor to perform operations. The operations include receiving a request from a user to access sensitive data related to an event. The operations also include identifying a role of the user and identifying a role-based entitlement of the user based on the role of the user. The operations also include determining, using the role-based entitlement of the user, a user entitlement. The operations further include generating a secured view associated with the user entitlement and communicating the secured view to the user.

According to a second embodiment, a network element includes one or more processors and one or more computer-readable non-transitory storage media coupled to the one or more processors and including instructions that, when executed by the one or more processors, cause the network element to perform operations. The operations include obtaining datasets from one or more applications. The datasets may include functional data and control data related to a plurality of events. The operations also include defining a functional table using the functional data and defining a control table using the control data. The operations further include joining the functional table and the control table to generate an entitlement table.

In accordance with certain embodiments, defining the functional table using the functional data includes mapping a plurality of keys to the plurality of events. In accordance with certain embodiments, defining the control table using the control data includes mapping the plurality of keys to a plurality of users. In accordance with certain embodiments, joining the functional table and the control table to generate the entitlement table includes using the plurality of keys to join the functional table and the control table.

In accordance with some embodiments, obtaining the datasets from the one or more applications includes: receiving the datasets via one or more push application programming interfaces (APIs) associated with the one or more applications, receiving the datasets via one or more locations shared with the one or more applications, and/or receiving the datasets from one or more data stores associated with the one or more applications via a stream.

In accordance with some embodiments, the one or more control tables include a role-based control table. In certain embodiments, the role-based control table includes one or more of the following fields: a first field indicating a plurality of users; a second filed indicating a plurality of roles associated with the plurality of users; a third field indicating one or more divisions associated with one or more of the plurality of users; a fourth field indicating one or more business lines associated with one or more of the plurality of users; a fifth field indicating one or more events associated with one or more of the plurality of users; and/or a sixth field indicating a geographical location associated with one or more of the plurality of users.

In accordance with some embodiments, the one or more control tables include an event-based control table. In certain embodiments, the event-based control table includes one or more of the following fields: a first field indicating a plurality of events; a second field indicating one or more divisions associated with one or more of the plurality of events; a third field indicating one or more business lines associated with one or more of the plurality of events; a fourth field indicating a geographical location associated with one or more of the plurality of events; a fifth field indicating whether one or more of the plurality of events includes sensitive information; and/or a sixth field indicating whether one or more of the plurality of events includes a sensitive flag.

In accordance with some embodiments, the one or more applications include a plurality of applications. In certain embodiments, each of the datasets is associated with a respective application of the plurality of applications. In accordance with some embodiments, each of the plurality of applications is associated with a different data store. In certain embodiments, defining the control table using the control data includes identifying one or more rules and/or applying the one or more rules to the functional data.

According to another second embodiment, a method includes obtaining datasets from one or more applications. The datasets include functional data and control data related to a plurality of events. The operations also include defining a functional table using the functional data and defining a control table using the control data. The operations further include joining the functional table and the control table to generate an entitlement table.

According to yet another second embodiment, one or more computer-readable non-transitory storage media embody instructions that, when executed by a processor, cause the processor to perform operations. The operations include obtaining datasets from one or more applications. The datasets include functional data and control data related to a plurality of events. The operations also include defining a functional table using the functional data and defining a control table using the control data. The operations further include joining the functional table and the control table to generate an entitlement table.

Technical advantages of certain embodiments of this disclosure may include one or more of the following. Certain embodiments of this disclosure democratize sensitive data by uplifting and consolidating division-wide (e.g., NFR) reporting that is currently scattered throughout the division's space. In certain embodiments described herein, multiple divisions/teams can subscribe and co-locate data with other divisions/teams, perform database joins, and share data to any system that is part of the ecosystem. In certain embodiments, the reporting load is removed from the transactional store, which reduces the load on the transactional store and reduces performance implication on applications. In some embodiments, the overhead of the application team of exposing APIs for different client-needs is reduced by providing a self-service method to query data and use the data for reporting and/or analytics. In certain embodiments, data security is addressed at every stage. Certain embodiments described herein make data accessible to entitled users with less constraints. Certain embodiments of this disclosure allow data owners to keep online transaction processing (OLTP) stores for create, read, update, and delete (CRUD) operations for reporting purposes. In some embodiments, reporting, analytics, and extract, transform, and load (ETL) tools are compatible with the systems described herein and are not limited on APIs. As such, reporting tools can take full advantage of the underlying databases.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 1:
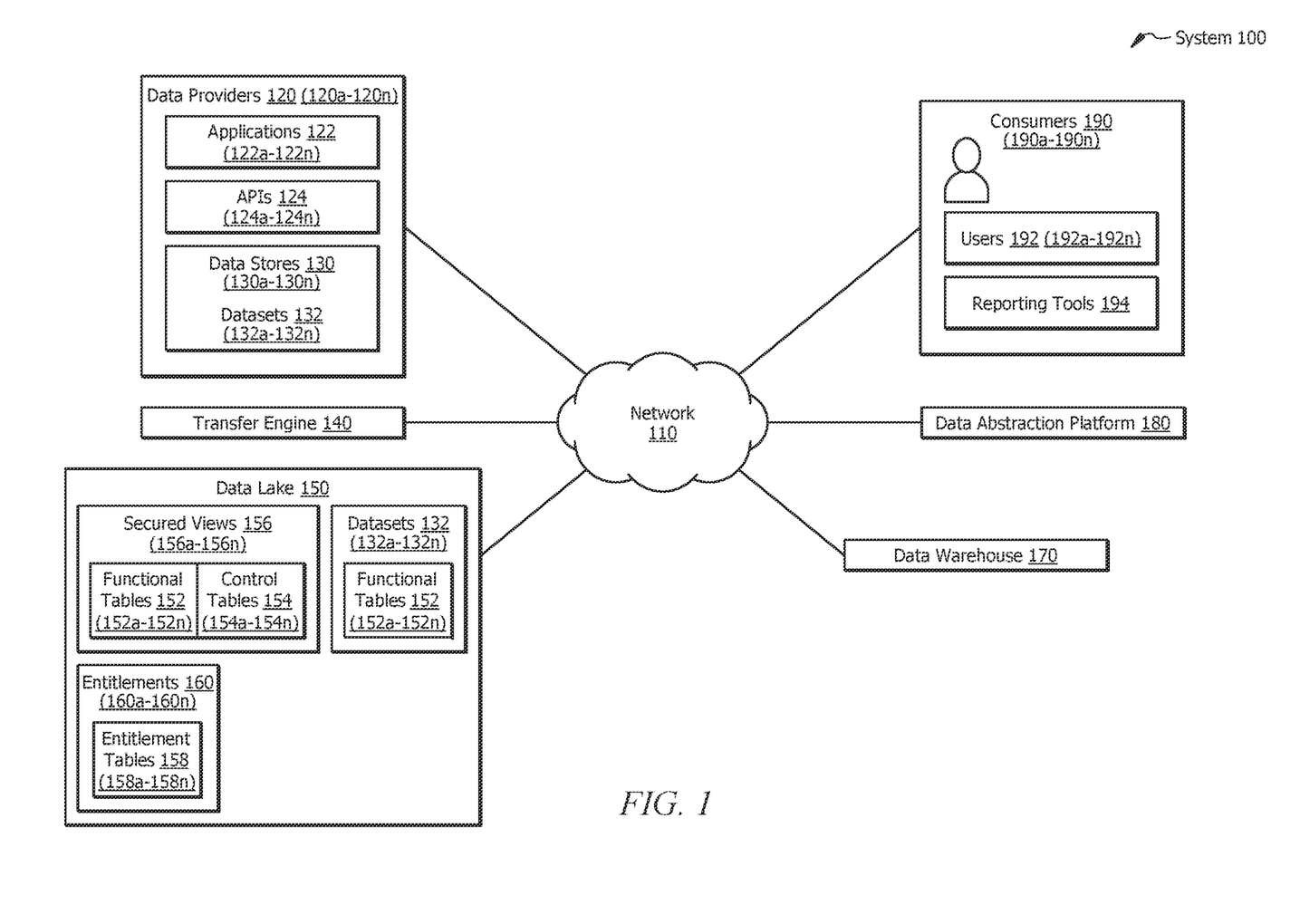
FIG. 1 illustrates an example system for democratizing sensitive data, in accordance with certain embodiments.

This disclosure describes systems and methods for democratizing sensitive data. FIG. 1 illustrates a system 100 for democratizing sensitive data, in accordance with certain embodiments. System 100 or portions thereof may be associated with an entity, which may include any entity, such as a business, company, or enterprise, that democratizes sensitive data. In certain embodiments, the entity may be associated with global markets, investment banking, operations management, asset management, consumer and wealth management, and the like. The components of system 100 may include any combination of hardware, firmware, and software. For example, the components of system 100 may use one or more elements of the computer system of FIG. 8.

In the illustrated embodiment of FIG. 1, system 100 includes a network 110, data providers 120, applications 122, application programming interfaces (APIs) 124, data stores 130, datasets 132, a transfer engine 140, a data lake 150, functional tables 152, control tables 154, secured views 156, entitlement tables 158, entitlements 160, a data warehouse 170, a data abstraction platform 180, consumers 190, users 192, and reporting tools 194.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined wide area network (SD-WAN), a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a Wi-Fi network, etc. In certain embodiments, one or more components of system 100 communicate over network 110.

Network 110 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more physical devices, virtual machines, bare metal servers, and the like. As another example, nodes may include data communications equipment such as computers, routers, servers, printers, workstations, devices, switches, bridges, modems, hubs, and the like.

Data providers 120 (data provider 120a through data provider 120n, where n represents any suitable integer) of system 100 are entities (e.g., companies, businesses, or organizations) that provide data for use by third parties. In certain embodiments, data providers 120 provide tools and/or frameworks for inventorying, reporting, analyzing, and/or managing data. In the illustrated embodiment of FIG. 1, data providers 120 are associated with applications 122, APIs 124, data stores 130, and datasets 132.

Applications 122 (application 122a through application 122n, where n represents any suitable integer) of system 100 are programs that detect, escalate, monitor, inventory, report, analyze, and/or manage data for data owners. Applications 122 may handle different types of data such as NFR data (data associated with risks other than the traditional financial risks of market, credit, and/or liquidity), financial risk data (market, credit, and/or liquidity data), sensitive data (data that may result in loss of an advantage and/or level of security if disclosed to unauthorized parties), etc. Sensitive data may be related to customer positions, firm positions, MNPI, PII, governance, risk, compliance, information leakage, loss of material assets, environmental damage, injury, disruption of operations, etc. In certain embodiments, the different types of data may overlap. For example, data may be both NFR data and sensitive data.

In certain embodiments, applications 122 manage data associated with one or more users 192. For example, applications 122 may manage data related to the roles, divisions, business lines, events, geographical locations, and so on of users 192. In some embodiments, applications 122 manage data associated with one or more events (e.g., NFR events). Events may be related to compliance failures, misconduct, technology, operational challenges, etc.

In certain embodiments, applications 122 are used to manage risk and control assessment, collect inventory of risk and controls, collect inventory of operational risk events, and so on. For example, applications 122 may use empirical data in an entity's operational risk capital calculation to trigger risk control self-assessment (RCSA). Applications 122 may be associated with one or more of the following: operational risk and converged assessments (ORCA), an operational risk event management system (OMEGA), Model IT, an operational resilience system (OPERA), a metrics platform, NFR analytics, and so on. In the illustrated embodiment of FIG. 1, applications 122 use one or more APIs 124.

APIs 124 (API 124a through API 124n, where n represents any suitable integer) of system 100 are software intermediaries that allow applications 122 to communicate with each other and/or other components of system 100. For example, data lake 150 of system 100 may use APIs 124 to access applications 122 and/or their associated data stores 130. In certain embodiments, each application 122 may be associated with a plurality of APIs 124.

Data stores 130 (data store 130a through data store 130n, where n represents any suitable integer) of system 100 are repositories for storing and/or managing collections of data. For example, data stores 130 may store and/or manage datasets 132 collected by applications 122. Data stores 130 may include one or more transactional stores (e.g., OLTP stores). Data stores 130 may capture, store, and/or process data from transactions, record business interactions as they occur in the daily operation of the organization, etc. In certain embodiments, data stores 130 store datasets 132 in one or more databases. The databases may be designed to accommodate frequent inserts, updates, lookups on primary key, etc.

In certain embodiments, each application 122 has its own data store 130. For example, each application 122 may use a relational model database server (e.g., Sybase Adaptive Server Enterprise (ASE)) as its transactional store. In some embodiments, data stores 1230 are owned by one or more divisions. For example, an NFR division may own a first set of data stores 130, a global market division (GMD) may own a second set of data stores 130, an investment banking division (IBD) may own a third set of data stores, and so on. In some embodiments, applications 122 source data and validate the data before making datasets 132 available to data stores 130.

Datasets 132 (dataset 132a through dataset 132n, where n represents any suitable integer) are collections of data (e.g., NFR data, financial risk data, sensitive data, etc.). In certain embodiments, data providers 120 collect datasets 132 from cloud accounts, workloads, etc. In some embodiments, datasets 132 are used for CRUD operations. Data providers 120 and/or data owners may use datasets 132 to detect, prioritize, and/or remediate security risks and/or compliance issues across a network (e.g., a cloud estate).

Datasets 132 include functional datasets and control datasets. Functional datasets are structured representations of the functions (e.g., activities, actions, processes, operations) within applications 122. Functional datasets may include data related to transactions, assessments, events impacts and details, operational metrics, resilience plans, operational risk capital, security groups, network configurations, vulnerabilities, policies, other configuration settings, conduct risks (losses due to the behavior of employees), cyber risks (losses due to security breaches), compliance risks (risks related to governance, risk management, compliance, etc.), regulatory risks (potential losses due to changes of the law and regulations), reputational risks (potential losses caused by the damage to an entity's reputation), firm reference data (e.g., accounts, legal entity, etc.), compensation details, client relationships, firm losses, and so on.

Control datasets are structured representations that include the attributes used to map users 192 to entitlements 160. Control datasets may be used to determine event sensitivity levels (e.g., sensitive or non-sensitive), which users 192 are associated with certain events (e.g., a person is reporter/coordinator etc.), the relationships between users 162 and roles (e.g., whether users 162 have divisional or firm-wide reader roles), whether the events are associated with geographical locations (e.g., China or India), and the like. In certain embodiments, control datasets are used to define entitlements 160.

Transfer engine 140 is a network component that connects to other systems for data import and/or data export. For example, transfer engine 140 may connect to applications 122, APIs 124, and/or data stores 130 to import data from data stores 130. As another example, transfer engine 140 may connect to data lakes 140 to export data to data lakes 140. In certain embodiments, transfer engine 140 operates as a distributed event store and/or a stream-processing platform. In some embodiments, transfer engine 140 provides a unified, high-throughput, low-latency platform for handling real-time data feeds. Transfer engine 140 may use Apache Kafka, IgnitePad, Google Cloud Pub/Sub, MuleSoft Anypoint Platform, Confluent, IBM MQ, RabbitMQ, Amazon MQ, KubeMQ, Azure Event Hubs, a combination thereof, etc. In the illustrated embodiment of FIG. 1, transfer engine 140 facilitates communication between data stores 130 and data lake 150.

Data lake 150 of system 100 represents a centralized repository that stores, processes, manages, and/or secures large amounts of data (e.g., datasets 132). Data lake 150) may centrally collate data from across divisions and share data with different divisions/teams. In certain embodiments, users 192 subscribe to data lake 150 to view their entitled datasets 132. Data owners may generate functional tables 152 and/or control tables 154 on data lake 150. In some embodiments, data owners create secured views 156 by joining functional tables 152 and/or control tables 154. Rather than granting subscribers access rights to functional tables 152 and/or control tables 154, data owners may only allow subscribers access to secured views 156. Data owners retain ownership of the database instance (e.g., the collection of functional tables 152 and/or control tables 154) on data lake 150.

In certain embodiments, data lake 150) stores data in its native format. Data lake 150 may include structured data from relational databases (e.g., rows and columns), semi-structured data (e.g., comma-separated values (CSVs), logs, Extensible Markup Language (XML), JavaScript Object Notation (JSON), etc.), unstructured data (e.g., emails, documents, Portable Document Formats (PDFs), etc.) binary data (e.g., images, audio, video, etc.), and the like.

In some embodiments, datasets 132 are published to data lake 150. For example, changes on applications 122 may be captured and published to data lake 150 using transfer engine 140 (e.g., Kafka, an external push, etc.). In certain embodiments, data lake 150 operates periodically (e.g., daily, hourly, etc.). Data lake 150 may read from transfer engine 140) (e.g., Kafka) and apply changes on its internal storage. For example, data lake 150 may periodically read from transfer engine 140) and apply updates to functional tables 152. In some embodiments, control data is moved to data lake 150 and used to determine entitlements 160. The control data may be batch-based and executed periodically (e.g., hourly, twice daily, etc.).

Data lake 150 may ingest individual datasets 132 according to one or more processes. In certain embodiments, data lake 150 provides parallel processing for multiple data ingestions. Data lake 150 may provide notifications (e.g., alerts) of ingestion fail or partial ingestion. Data lake 150 may be established in any suitable location. For example, data lake 150 may be established on premises (e.g., within an entity's data centers) or in the cloud (e.g., using cloud services from vendors such as Amazon, Microsoft, or Google).

In certain embodiments, data lake 150 is used to share datasets 132 associated with a particular division with other divisions. For example, data lake 150 may be used to share NFR divisional data (e.g., event details, impact, risk statements, and assessments, NFR-owned reference data, etc.) for assessment unit hierarchy, division classification, and so on with other divisions (e.g., GMD, finance, IBD, operations, etc.).

In some embodiments, the reporting of sensitive data may require datasets 132 from different applications 122 to be joined together. Data lake 150 may serve as a common data store to join information from different datasets 132. In certain embodiments, data lake 150 assists users 192 in joining risk data with other reference data such as Entity Master Management Applications (EMMA) data, people data, and so on. For example, GMD may use data lake 150 to join risk assessment and events data with GMD transactional data. In certain embodiments, data lake 150 uses functional tables 152 and control tables 154 to join this information.

Functional tables 152 (functional table 152a through functional table 152n, where n represents any suitable integer) are tables generated using functional datasets. Functional datasets in data stores 130 may not accurately depict functional structure. During data modelling, datasets 132 may be defined keeping their functional nature. In certain embodiments, datasets 132 of functional tables 152 are shared with entitled downstream consumers 190 for reporting purposes. Changes in the transactional model do not impact functional tables 152.

In certain embodiments, each domain (division or team) creates one or more functional tables 152 using its own functional datasets. For example, an NFR division may obtain NFR datasets 132 from one or more data stores 130 and create one or more functional tables 152 using NFR datasets 132. As another example, a GMD division may obtain GMD datasets 132 from one or more data stores 130 and create one or more functional tables 152 using GMD datasets 132. In certain embodiments, the division/team owns functional tables 152 that have been created using its own datasets 132.

Control tables 154 (control table 154a through control table 154n, where n represents any suitable integer) are tables generated using control datasets. In certain embodiments, control tables 154 include the attributes needed to map users 192 to entitled records within functional tables 152. Depending on the complexity of the domain and entitlement, one or more control tables 154 may be required. Each control table 154 has logically related attributes. For example, control table 154a may map one or more users 192 to a corresponding role and to one or more dataset attributes related to the role. As another example, control table 154b may map one or more events to one or more dataset attributes related to the event.

In certain embodiments, each domain (division or team) creates one or more control tables 154 using its own control datasets. For example, an NFR division may obtain NFR datasets 132 from data stores 130 and create one or more control tables 154 using the NFR datasets. As another example, a GMD division may obtain GMD datasets 132 from one or more data stores 130 and create one or more control tables 154 using GMD datasets 132. In certain embodiments, the division/team owns control tables 154 that have been created using its own datasets 132.

Secured views 156 (secured view 156a through secured view 156n, where n represents any suitable integer) are designed for data privacy. In certain embodiments, secured views 156 limit access to sensitive data that should not be exposed to all users 192 of functional tables 152. In some embodiments, secured views 156 prevent users 192 from possibly being exposed to unentitled data provided in functional tables 152.

Secured views 156 may be generated using one or more rules. For example, secured views 156 may depend on one or more of the following conditions: whether an event is classified as sensitive or non-sensitive, whether users 192 are associated (e.g., named) one or more events (e.g., a person is reporter/coordinator etc.); whether users 192 have a particular role, whether users 192 are geographically based in certain locations (e.g., China or India); whether the events are geographically based in certain locations; and so on.

Entitlement tables 158 (entitlement table 158a through entitlement table 158n, where n represents any suitable integer) represent tables that are generated by joining datasets 132 from functional tables 152 and control tables 154 and filtering records for users 192 based on user entitlements 160. In certain embodiments, entitlement tables 158 include row-level entitlements 160. Entitlements 160 represent rights to use, access and/or consume certain types of data (e.g., sensitive data). Entitlements 160 may be governed by one or more rules. In certain embodiments, entitlement tables 158 and/or entitlements 160 may be communicated to data warehouse 170 via secured views 156.

Data warehouse 170 of system 100 represents a central repository of integrated data from one or more disparate sources. In certain embodiments, data warehouse 170 is used for reporting and data analysis. For example, data warehouse 170 may be used as a reporting tier for scalable and performant reporting. In certain embodiments, data warehouse 170 uses databases that are designed to accommodate fast queries, large concurrent hits, support analytics, reporting, etc. In some embodiments, each division (e.g., an NFR division, a GMD, an IBD, etc.) is associated with its own data warehouse 170.

In certain embodiments, data warehouse 170 subscribes to datasets 132 that are published to data lake 150. Data warehouse 170 may refresh one or more datasets 132 according to a schedule. For example, data warehouse 170 may refresh a first group of datasets 132 once a day, a second group of datasets every 30 minutes, and so on, depending on one or more service-level objectives (SLOs). Data warehouse 170 may use one or more of the following services: Snowflake Cloud Data Platform, Amazon Redshift, Amazon Redshift, Microsoft Azure Synapse Analytics, Google BigQuery, a combination thereof, or any other suitable platform.

Data abstraction platform 180 represents a modeling and query platform. In certain embodiments, data abstraction platform 180 includes languages and/or analyzers for software modeling. For example, data abstraction platform 180 may include declarative specification languages for expressing complex structural constraints and/or behavior in certain software systems. In some embodiments, data abstraction platform 180 provides a structural modeling tool based on first-order logic.

In certain embodiments, data abstraction platform 180 provides users 192 with tools to perform an adhoc query or analysis on datasets 132 stored in data warehouse 170. For example, users 192 may receive entitlement tables 158 from data warehouse 170 and use data abstraction platform 180 to analyze entitlements 160 for reporting purposes. In some embodiments, data abstraction platform 180 models entitlements 160 for specific reporting requirements. In certain embodiments, data abstraction platform 180 models entitlements 160 such that they can be accessed by reporting tools 194 (e.g., Jupyter notebook, Tableau, an entity's dashboard, Alteryx, Ignitepad, etc). In certain embodiments, data abstraction platform 180 uses Alloy (e.g., Alloy Query Builder, Alloy Services, etc.) to model entitlements 160 such that they are accessible by different reporting tools 194.

Consumers 190 (e.g., consumer 190a through consumer 190n, where n represents any suitable integer) are individuals and/or entities that analyze and report datasets 132 to entities. Consumers 190 may include operation risk managers, NFR groups, analysis and reporting groups in risk engineering, first line risk managers, senior management across risk divisions, and the like. Consumers 190 may include one or more users 192. Users 192 (e.g., user 192a through user 192n, where n represents any suitable integer) are persons who utilize one or more components of system 100. For example, users 192 may request entitlements 160 from data lake 150. In certain embodiments, users 192 are associated with user accounts. For example, users 192 may use usernames, passwords, or a combination thereof to log into data lake 150.

In certain embodiments, users 192 use one or more reporting tools 194 to analyze and/or report datasets 132. Reporting tools 194 may generate charts, graphs, alerts, etc. for the web when connected to supported data sources. Reporting tools 194 may include Jupyter notebook, Tableau, Grafana, an entity's dashboard, Alteryx, Ignitepad, etc. In certain embodiments, users 192 use reporting tools 194 to convert entitlements 160 into a structured form such as a report. Reports may be associated with RCSA, operational risk events, capital calculations, operational risk metrics functions, etc. In certain embodiments, reports are regulatory. Reports may be used by various divisions for their risk management. In certain embodiments, reports are used as input into capital calculations.

In operation, data lake 150 uses APIs 124 to access applications 122 (e.g., ORCA, OMEGA, OPERA, etc.) and their associated data stores 130. Data lake 150 retrieves datasets 132 from data stores 130 and stores datasets 132 internally. Data lake 150 uses transfer engines 140 (e.g., Kafka) to periodically check for changes to applications 122. When changes are detected, data lake 150 reads from transfer engine 140 and applies the changes to datasets 132 in its internal storage. Changes on applications 122 may be captured and published to data lake 150 either by transfer engine 140 or an external push. Datasets 132 include functional data and control data. Data lake 150 defines functional tables 152 using the functional data and control tables 154 using control data. Data lake 150 joins functional tables 152 and control tables 154 to generate entitlement tables 158 with row-level entitlements 160.

User 192a subscribes to data lake 150 and logs into data lake 150. While logged in, user 192a communicates a request to data lake 150 to access entitlements 160. Data lake 150 identifies user 192a based on the login credentials of user 192a and generates entitlement table 158a for user 192a by filtering row-level entitlements 160 based on one or more attributes associated with user 192a. Data lake 150 communicates secure view 156a, which includes entitlement table 158a, to data warehouse 170 of user 192a. Data abstraction platform 180 (e.g., Alloy) models entitlement table 158a received from data lake 150 to make entitlement table 158a compatible with reporting tools 194. User 192a uses reporting tools 194 (e.g., Jupyter) to generate one or more reports. As such, system 100 may be used to generate entitlements 160 in a structured, maintainable, and efficient manner so that they are easily shared with users 192 across different divisions.

Although FIG. 1 illustrates a particular number of networks 110, data providers 120, applications 122, APIs 124, data stores 130, datasets 132, transfer engines 140, data lakes 150, functional tables 152, control tables 154, secured views 156, entitlement tables 158, entitlements 160, data warehouses 170, data abstraction platforms 180, consumers 190, users 192, and reporting tools 194, this disclosure contemplates any suitable number of networks 110, data providers 120, applications 122, APIs 124, data stores 130, datasets 132, transfer engines 140, data lakes 150, functional tables 152, control tables 154, secured views 156, data warehouses 170, data abstraction platforms 180, consumers 190, users 192, and reporting tools 194.

Although FIG. 1 illustrates a particular arrangement of network 110, data providers 120, applications 122, APIs 124, data stores 130, datasets 132, transfer engine 140, data lakes 150, functional tables 152, control tables 154, secured views 156, entitlement tables 158, entitlements 160, data warehouses 170, data abstraction platforms 180, consumers 190, and reporting tools 192, this disclosure contemplates any suitable arrangement of network 110, data providers 120, applications 122, APIs 124, data stores 130, datasets 132, transfer engine 140, data lakes 150, functional tables 152, control tables 154, secured views 156, entitlement tables 158, entitlements 160, data warehouses 170, data abstraction platforms 180, consumers 190, users 192, and reporting tools 194.

Furthermore, although FIG. 1 describes and illustrates particular components, devices, or systems carrying out particular actions, this disclosure contemplates any suitable combination of any suitable components, devices, or systems carrying out any suitable actions.

Figure 2:
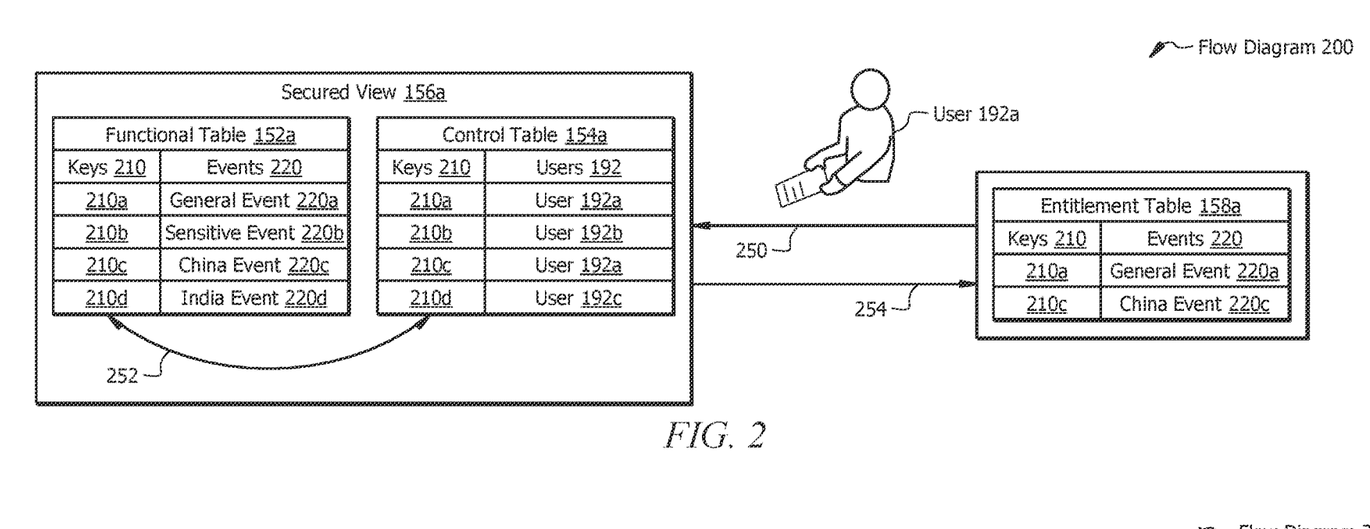
FIG. 2 illustrates an example flow diagram for democratizing sensitive data based on events, in accordance with certain embodiments.

FIG. 2 illustrates a flow diagram 200 for democratizing sensitive data based on events, in accordance with certain embodiments. Flow diagram 200 may be used by system 100 of FIG. 1. Flow diagram 200 includes secured view 156a, functional table 152a, control table 154a, users 192 (user 192a, user 192b, and user 192c), keys 210 (key 210a, key 210b, key 210c, and key 210d), events 220 (general event 220a, sensitive event 220b, China event 220c, and India event 220d), and entitlement table 158a.

Keys 210 are values that uniquely identify rows in functional table 152a, control table 154a, and entitlement table 158a. In the illustrated embodiment of FIG. 2, primary keys 210 are listed in the first column in functional table 152a, control table 154a, and entitlement table 158a. Events 220 represent different event classifications. For example, general event 220a may represent an event that is not classified as sensitive, sensitive event 220b may represent an event that includes sensitive data (e.g., NFR data), China event 220c may represent an event that is geographically associated with (e.g., located in) China, and India event 220d may represent an event that is geographically associated with (e.g., located in) India. In functional table 152, key 210a is mapped to general event 220a, key 210b is mapped to sensitive event 220b, key 210c is mapped to China event 220c, and key 210d is mapped to India event 220d. In control table 154, key 210a is mapped to user 192a, key 210b is mapped to user 192b, key 210c is mapped to user 192a, and key 210d is mapped to user 192c.

At step 250 of flow diagram 200, user 192a submits a query to secured view 156a. For example, user 192a may be logged into a data lake (e.g., data lake 150 of FIG. 1) and submit a request to secured view 156a to view one or more entitlements (e.g., entitlements 160 of FIG. 1). At step 252 of flow diagram 200, secured view 156a uses keys 210 to join control table 154a with functional table 152a. Secured view 156a determines that user 192a is mapped to key 210a and key 210c. Secured view 156a also determines that key 210a is mapped to general event 220a, and key 210c is mapped to China event 220c. Since user 192a is not mapped to key 210b or key 210d in control table 154a, secured view 156a generates entitlement table 158a for user 192a by filtering out the rows of functional table 152a associated with key 210b and key 210d. At step 254 of flow diagram 200, secured view 156a presents entitlement table 158a to user 192a. Entitlement table 158a includes entitlements associated with key 210a (general event 220a) and key 210c (China event 220c) but does not include information associated with key 210b (sensitive event 220b) and key 210d (India event 220d). As such, secured view 156a allows user 192a to efficiently access entitled datasets while preventing user 192a from potentially being exposed to unauthorized data (e.g., events classified as sensitive) that is listed in functional table 152.

Although FIG. 2 illustrates a particular number of functional tables 152, control tables 154, secured views 156, entitlement tables 158, users 192, keys 210, and events 220, this disclosure contemplates any suitable number of functional tables 152, control tables 154, secured views 156, entitlement tables 158, users 192, keys 210, and events 220. Although FIG. 2 illustrates a particular arrangement of functional table 152a, control table 154a, secured view 156a, entitlement table 158a, user 192a, keys 210a through 210d, and events 220a through 220d, this disclosure contemplates any suitable arrangement of functional table 152a, control table 154a, secured view 156a, entitlement table 158a, user 192a, keys 210a through 210d, and events 220a through 220d.

Although FIG. 2 describes and illustrates particular steps of flow diagram 200 as occurring in a particular order, this disclosure contemplates any suitable steps of flow diagram 200 occurring in any suitable order. Furthermore, although FIG. 2 describes and illustrates particular components, devices, or systems carrying out particular actions, this disclosure contemplates any suitable combination of any suitable components, devices, or systems carrying out any suitable actions.

Figure 3:
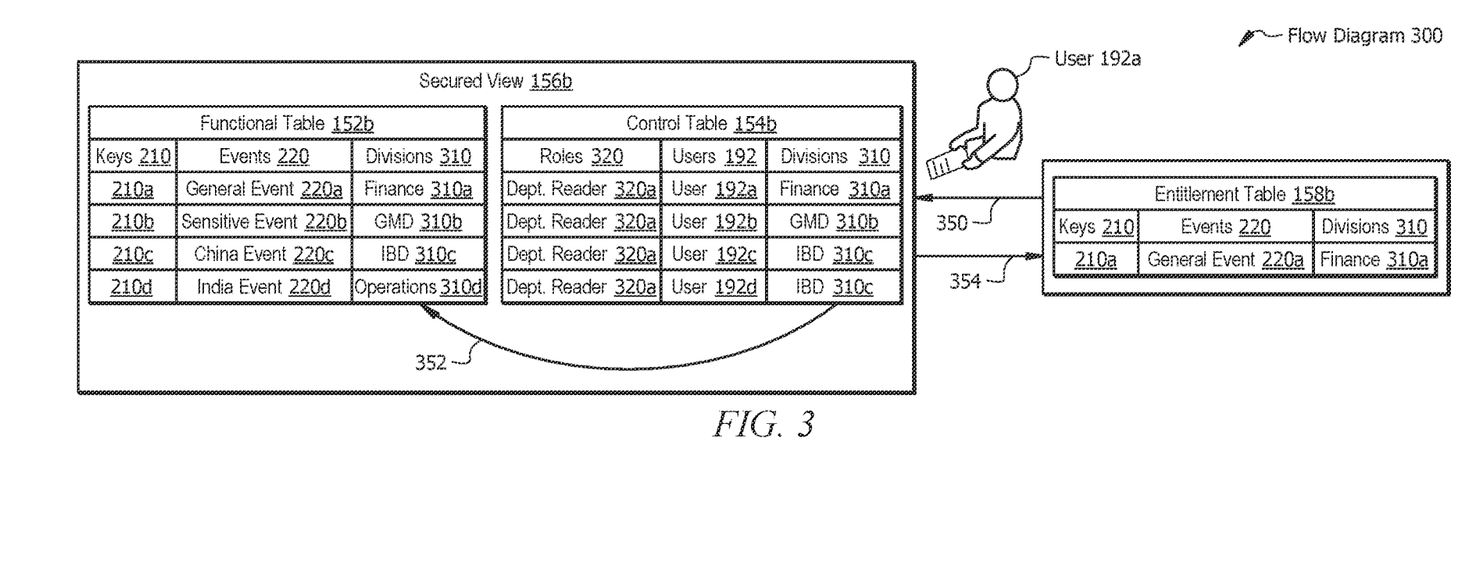
FIG. 3 illustrates an example flow diagram for democratizing sensitive data based on events and divisions, in accordance with certain embodiments.

FIG. 3 illustrates a flow diagram 300 for democratizing sensitive data based on events 220 and divisions 310, in accordance with certain embodiments. Flow diagram 300 may be used by system 100 of FIG. 1. Flow diagram 300 includes functional table 152b, control table 154b, entitlement table 158b, secured view 156b, users 192 (user 192a, user 192b, user 192c, and user 192d), keys 210 (key 210a, key 210b, key 210c, and key 210d), events 220 (general event 220a, sensitive event 220b, China event 220c, and India event 220d), divisions 310 (finance 310a, GMD 310b, IBD 310c, and operations 310d), and roles 320 (department reader role 320a).

Roles 320 represent job functions of users 192. Each role 320 is associated with a role-based entitlement. For example, department reader role 320a may allow associated users 192 to view all non-sensitive events 220 for divisions 310 configured for users 192. As another example, department reader role 320a may allow users 192 to read events 220 if the associated impact, cause, remediation, etc. of events 220) are associated to divisions 310 of users 192. Divisions 310 represent the parts into which an entity (e.g., a business, organization, company, etc.) is divided. Divisions 310 may include NFR teams, GMDs, IBDs, operations management divisions, equities teams, marketing divisions, finance divisions, human resource divisions, information technology (IT) divisions, etc. In the illustrated embodiment of FIG. 3, divisions 310 include finance division 310a, GMD 310b, IBD 310c, and operations division 310d.

In functional table 152b, key 210a is mapped to general event 220a and finance department 310a, key 210b is mapped to sensitive event 220b and GMD department 310b, key 210c is mapped to China event 220c and IBD department 310c, and key 210d is mapped to India event 220d and operations department 310d. In control table 154b, user 192a is mapped to department reader role 320a and finance division 310a, user 192b is mapped to department reader role 320a and GMD 310b, user 192c is mapped to department reader role 320a and IBD 310c, and user 192d is mapped to department reader role 320 and IBD 310c.

At step 350 of flow diagram 300, user 192a submits a query to secured view 156b. For example, user 192a may be logged into a data lake (e.g., data lake 150 of FIG. 1) and submit a request to secured view 156b to view one or more entitlements (e.g., entitlements 160 of FIG. 1).

At step 352 of flow diagram 300, secured view 156b uses keys 210 to join control table 154b with functional table 152b. Secured view 156b determines from control table 154b that user 192a is mapped to finance division 310a. Secured view 156b determines from functional table 154b that finance division 310a is mapped to general event 220a. Since user 192a is not mapped to GMD 310b, IBD 310c, or operations division 310d in control table 154b, secured view 156b generates entitlement table 158b for user 192a by filtering out the rows of functional table 152 associated with GMD 310b, IBD 310c, and operations division 310d.

At step 354 of flow diagram 300, secured view 156b presents entitlement table 158b to user 192a. Entitlement table 158b includes entitlement associated with key 210a (general event 220a and finance division 310a) but does not include information associated with key 210b (sensitive event 220b and GMD 310b), key 210c (China event 220c and IBD 310c), and key 210d (India event 220d and operations division 310d). As such, secured view 156b allows user 192a to efficiently access entitled datasets while preventing user 192a from potentially being exposed to unauthorized data (e.g., events classified as sensitive and events geographically associated with China and India) that are listed in functional table 152b.

Although FIG. 3 illustrates a particular number of functional tables 152, control tables 154, secured views 156, entitlement tables 158, users 192, keys 210, events 220, and divisions 310, this disclosure contemplates any suitable number of functional tables 152, control tables 154, secured views 156, entitlement tables 158, users 192, keys 210, events 220, and divisions 310. Although FIG. 3 illustrates a particular arrangement of functional table 152b, control table 154b, secured view 156b, entitlement table 158b, user 192a, keys 210a through 210d, events 220a through 220d, and divisions 310a through 310d, this disclosure contemplates any suitable arrangement of functional table 152a, control table 154a, secured view 156a, entitlement table 158a, user 192a, keys 210a through 210d, events 220a through 220d, and divisions 310a through 310d.

Although FIG. 3 describes and illustrates particular steps of flow diagram 300 as occurring in a particular order, this disclosure contemplates any suitable steps of flow diagram 300 occurring in any suitable order. Furthermore, although FIG. 3 describes and illustrates particular components, devices, or systems carrying out particular actions, this disclosure contemplates any suitable combination of any suitable components, devices, or systems carrying out any suitable actions.

Figure 4:
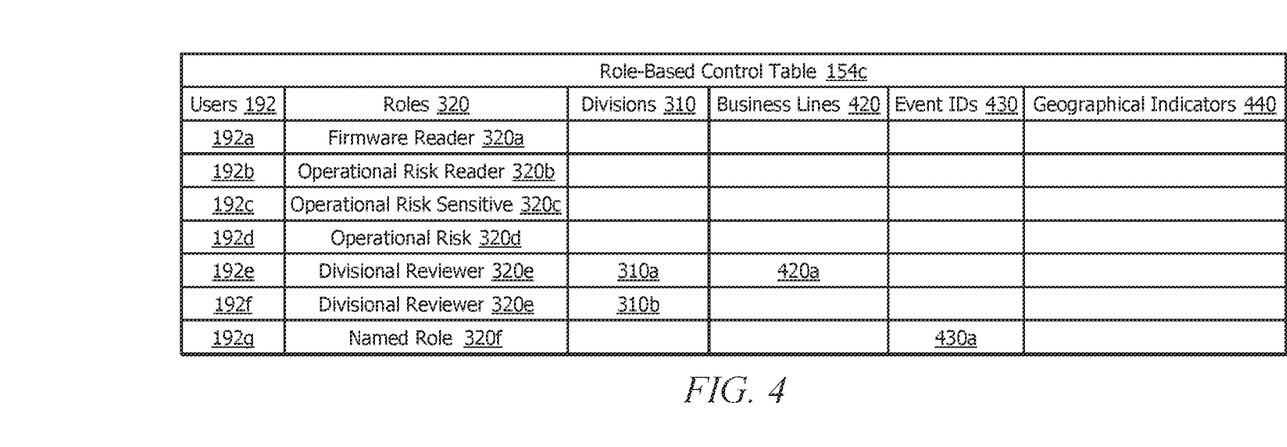
FIG. 4 illustrates an example role-based control table, in accordance with certain embodiments.

FIG. 4 illustrates a role-based control table 154c that maps users 192 to roles 320, in accordance with certain embodiments. Control table 154c may be used by system 100 of FIG. 1. Control table 154c includes the following columns: users 192 (user 192a, user 192b, user 192c, user 192d, user 192e, user 192f, and user 192g), roles 320 (firmwide reader role 320a, operational risk reader role 320b, operational risk sensitive role 320c, operational risk role 320d, divisional reviewer role 320e, and named role 320f), divisions 410 (division 410a and division 410b), business lines 420 (business line 420a), event identifiers 430 (event identifier 430a), and geographical indicators 440.

In certain embodiments, control table 154c is generated by extracting information related to users 192, roles 320, and attributes related to roles 320. Attributes related to roles 320 may include whether users 192 have divisional roles, which divisional data users 192 can access, geographical locations of users 192, reporting events, etc. In the illustrated control table 154c of FIG. 4, the attributes are related to divisions 410, business lines 420, event IDs 430, and geographical indicators 440. Control table 154c indicates that user 192e is associated with (part of) finance division 310a and user 192f is associated with (part of) GMD 310b.

Business lines 420 of control table 154c represent different lines within the same division 310. For example, finance division 310a may include a resource allocation business line 420a, a financial planning business line, a risk management business line, a cash flow management business line, an investment banking line, an asset management and securities line, and the like. Control table 154c indicates that user 192e is associated with business line 420a.

Event identifiers 430 of control table 154c are used to identity particular events. Events may be related to compliance failures, misconduct, technology, operational challenges, operational capital calculations, operational risk metrics functions, etc. Events may include operational risk events, risk and controls events, RCSA events, etc. Control table 154c indicates that user 192g is associated with event identifier 430a. For example, user 192g may have created event identifier 430a to represent an operational risk event.

Geographical indicators 440 of control table 154c represent geographical locations of one or more users 192. In certain embodiments, geographical indicators 440 indicate whether one or more users 192 requesting access to secured views 156 are geographically located in a particular region. For example, geographical indicators 440 may indicate whether one or more users 192 requesting access to secured views 156 are geographically located in a particular country (e.g., the United States, China, India, Brazil, etc.), a particular state (e.g., California, Texas, New York, etc.), a particular city (e.g., Los Angeles, Beijing, etc.), and the like.

Control table 154*c* does not include any geographical indicators 440 associated with users 192*a* through 192*g*.

In certain embodiments, roles 320 are associated with entitlement tables 158. For example, firmwide reader role 320*a*, operational risk reader role 320*b*, and operational risk role 320*d* may grant associated users 192 access to all non-sensitive events. As another example, operational risk sensitive role 320*c* may be grant associated users 192 access to all events. As still another example, divisional reviewer role 320*e* may grant associated users 192 access to all non-sensitive events for its associated divisions (e.g., if the event's impact, cause, remediation, etc. is associated to its division). As yet another example, named role 320*f* may grant associated users 192 access to events if user 192 is related to the event or its impact, cause, remediation, etc.

In control table 154*c*, user 192*a* is mapped to role 320*a* (firmwide reader); user 192*b* is mapped to role 320*b* (operational risk reader); user 192*c* is mapped to role 320*c* (operational risk sensitive); user 192*d* is mapped to role 320*d* (operational risk); user 192*e* is mapped to role 320*e* (divisional reviewer), division 410*a*, and business line 420*a*; user 192*f* is mapped to role 320*e* (divisional reviewer) and division 410*b*; and user 192*g* is mapped to role 320*f* (named role) and event identifier 430*a*.

In certain embodiments, entitlements are determined using control table 154*c*. For example, in accordance with control table 154*c*, divisional reviewer role 320*e* of user 192*e* may indicate that user 192*e* is entitled to view all non-sensitive events for division 310*a*. As another example, in accordance with control table 154*c*, divisional reviewer role 320*e* of user 192*f* may indicate that user 192*f* is entitled to view all non-sensitive events for division 310*b*. As still another example, in accordance with control table 154*c*, named role 320*f* of user 192*g* may indicate that user 192*g* is entitled to view events associated with event identifier 430*a*. As such, control table 154*c* prevents users 192 from potentially accessing unauthorized data.

Although FIG. 4 illustrates a particular number of users 192, divisions 310, roles 320, business lines 420, event identifiers 430, and geographical indicators 440, this disclosure contemplates any suitable number of users 192, divisions 310, roles 320, business lines 420, event identifiers 430, and geographical indicators 440. For example, control table 154*c* may include more or less than seven users 192.

Although FIG. 4 illustrates a particular arrangement of users 192, divisions 310, roles 320, business lines 420, event identifiers 430, and geographical indicators 440, this disclosure contemplates any suitable arrangement of users 192, divisions 310, roles 320, business lines 420, event identifiers 430, and geographical indicators 440. For example, the data in control table 154*c* may be represented in a graph, a chart, or any other suitable format.

Furthermore, although FIG. 4 describes and illustrates particular components, devices, or systems carrying out particular actions, this disclosure contemplates any suitable combination of any suitable components, devices, or systems carrying out any suitable actions.

Figure 5:
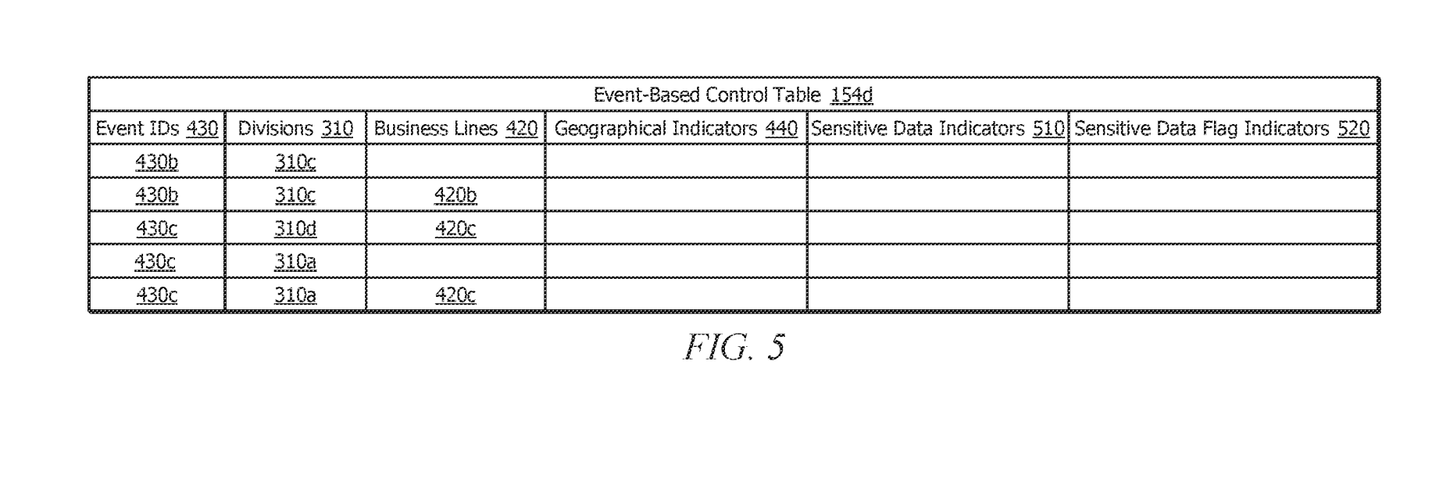
FIG. 5 illustrates an example event-based control table, in accordance with certain embodiments.

FIG. 5 illustrates an event-based control table 154*d* that maps events 430 to event attributes, in accordance with certain embodiments. Control table 154*d* may be used by system 100 of FIG. 1. Control table 154*d* includes the following columns: event identifiers 430 (event identifier 430*b* and event identifier 430*c*), divisions 310 (division 310*a*, division 310*c*, and division 310*d*), business lines 420 (business line 420*b* and business line 420*c*), geographical indicators 440, sensitive data indicators 510, and sensitive data flag indicators 520.

In certain embodiments, control table 154*d* is generated by extracting information related to event identifiers 430. Attributes related to event identifiers 430 may include whether related events are associated with particular divisions 310, whether related events are associated with particular business lines 420, geographical locations of events associated with event identifiers 430, whether related events are associated with sensitive data, related events are associated with sensitive data flags, etc. In the illustrated control table 154*d* of FIG. 5, the event attributes are related to divisions 310, business lines 420, geographical indicators 440, sensitive data indicators 510, and sensitive data flag indicators 520.

Sensitive data indicators 510 indicate whether events associated with event identifiers 430 are sensitive. Events may be classified as sensitive or non-sensitive based on severity, risk profile, typical usage, regulatory applications, etc. Sensitive data flag indicators 520 indicate whether masking is required for specific attributes associated with events (e.g., sensitive events). For example, masking may be required for events classified as sensitive. In certain embodiments, sensitive data flag indicators 520 may indicate which data is not saved in the data lake (e.g., data lake 150). For example, answers received from users 192 to fields having active sensitive flag indicators 520 may not be saved in data lake 150.

In control table 154*d*, event identifier 430*b* is mapped to division 310*c*; event identifier 430*b* is mapped to division 310*c* and business line 420*b*; event identifier 330*c* is mapped to division 310*d* and business line 420*c*; event identifier 430*c* is mapped to division 310*a*; and event identifier 430*c* is mapped to division 310*a* and business line 420*c*.

In certain embodiments, entitlements are determined using control table 154*d*. For example, in accordance with control table 154*d*, depending on a user's role, a user may only be entitled to view the event associated with event identifier 430*b* if the user is associated with division 310*c* and/or business line 420*b*. As another example, a user may only be entitled to view the event associated with event identifier 430*c* if the user is associated with division 310*a*, division 310*d*, and/or business line 420*c*. As such, control table 154*c* prevents users 192 from potentially accessing unauthorized data.

Although FIG. 5 illustrates a particular number of event identifiers 430, divisions 310, business lines 420, geographical indicators 440, sensitive data indicators 510, and sensitive data flag indicators 520, this disclosure contemplates any suitable number of event identifiers 430, divisions 310, business lines 420, geographical indicators 440, sensitive data indicators 510, and sensitive data flag indicators 520. For example, control table 154*c* may include more or less than two different event identifiers 430.

Although FIG. 5 illustrates a particular arrangement of event identifiers 430, divisions 310, business lines 420, geographical indicators 440, sensitive data indicators 510, and sensitive data flag indicators 520, this disclosure contemplates any suitable arrangement of event identifiers 430, divisions 310, business lines 420, geographical indicators 440, sensitive data indicators 510, and sensitive data flag indicators 520. For example, the data in control table 154*d* may be represented in a graph, a chart, or any other suitable format.

Furthermore, although FIG. 5 describes and illustrates particular components, devices, or systems carrying out particular actions, this disclosure contemplates any suitable combination of any suitable components, devices, or systems carrying out any suitable actions.

Figure 6:
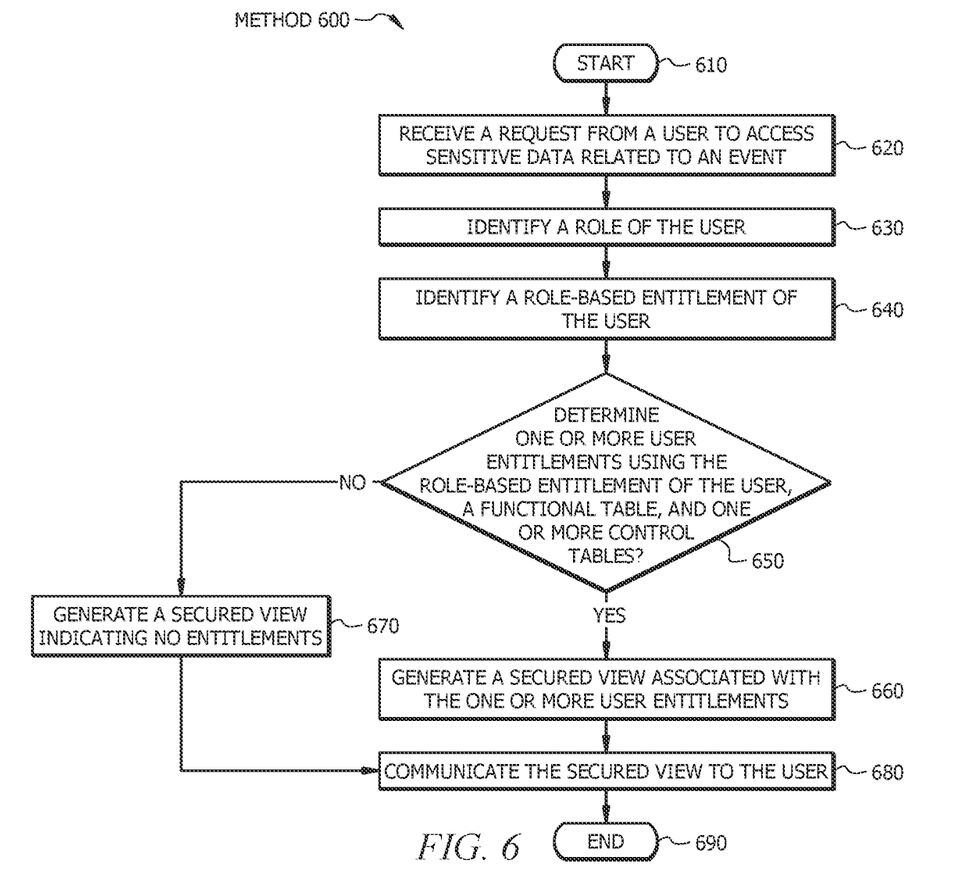
FIG. 6 illustrates an example method for generating secured views, in accordance with certain embodiments.

FIG. 6 illustrates an example method 600 for generating secured views, in accordance with certain embodiments. Method 600 begins at step 610. At step 620 of method 600, a data lake receives a request from a user to access sensitive data related to an event. For example, referring to FIG. 1, data lake 150 may receive a request from user 192a to access sensitive data related to an NFR event. Method 600 then moves from step 620 to step 630.

At step 630 of method 600, the data lake identifies a role of the user. For example, referring to FIG. 4, the data lake may use role-based control table 154c to determine that user 192a is associated with firmwide reader role 320a. The roles may include a firmwide reader role, an operational risk reader role, an operational risk sensitive role, an operational risk role, a divisional reviewer role, a named role, a business line reader role, and the like. Method 600 then moves from step 630 to step 640.

At step 640 of method 600, the data lake identifies a role-based entitlement of the user based on the user's role. For example, the data lake may determine that the firmwide reader role and the operational risk reader role allow the user to view all non-sensitive events. As another example, the data lake may determine that the operational risk sensitive role allows the user to see all events. As still another example, the data lake may determine that the divisional reviewer role allows the user to view all non-sensitive events for its divisions if the event's associated impact, cause, remediation, etc. is associated to its division. As still another example, the data lake may determine that the business line reader role allows the user to view all non-sensitive events associated with its divisions and business lines. As yet another example, the data lake may determine that the named role allows the user to view events if the user is related to the event or its associated impact, cause, or remediation. Method 600 then moves from step 640 to step 650.

At step 650 of method 600, the data lake determines whether the user is authorized to view one or more entitlements. For example, referring to FIG. 1, data lake 150 may determine whether user 192 is allowed to view one or more user entitlements 160 using the role-based entitlement of user 192a, functional table 152a, and control table 154a. In certain embodiments, the data lake joins the functional table and control table and filters out the entitlements based on the user's role-based entitlement. For example, referring to FIG. 2, the data lake may determine that user 192a is allowed to view general event 220a and China event 220c but not sensitive event 220b and India event 220d.

If, at step 650, the data lake determines that the user is authorized to view one or more entitlements, method 600 moves from step 650 to step 660, where the data lake generates a secured view associated with the one or more user entitlements. For example, referring to FIG. 2, data lake may generate secured view 156a that includes entitlement table 158a, which filters out the entitlements based on the user's identity. Secured view 156a of FIG. 2 does not include functional table 152a or control table 154a.

If, at step 650, the data lake determines that the user is not authorized to view one or more entitlements, method 600 moves from step 650 to step 670, where the data lake generates a secured view indicating that the user is not authorized to view the requested entitlements. For example, the data lake may generate a secured view associated with a notification to the user indicating that no entitlement records were found. Method 600 then moves from steps 660 and 670 to step 680, where method 600 ends. As such, method 600 may be used to efficiently generate secured views while protecting sensitive information from unauthorized disclosure.

Although this disclosure describes and illustrates particular steps method 600 of FIG. 6, as occurring in a particular order, this disclosure contemplates any suitable steps of method 600 of FIG. 6 occurring in any suitable order. Although this disclosure describes and illustrates an example method for generating secured views including the particular steps of the method of FIG. 6, this disclosure contemplates any suitable method for generating secured views including any suitable steps, which may include all, some, or none of the steps of the method of FIG. 6, where appropriate. Furthermore, although FIG. 6 describes and illustrates particular components, devices, or systems carrying out particular actions, this disclosure contemplates any suitable combination of any suitable components, devices, or systems carrying out any suitable actions.

Figure 7:
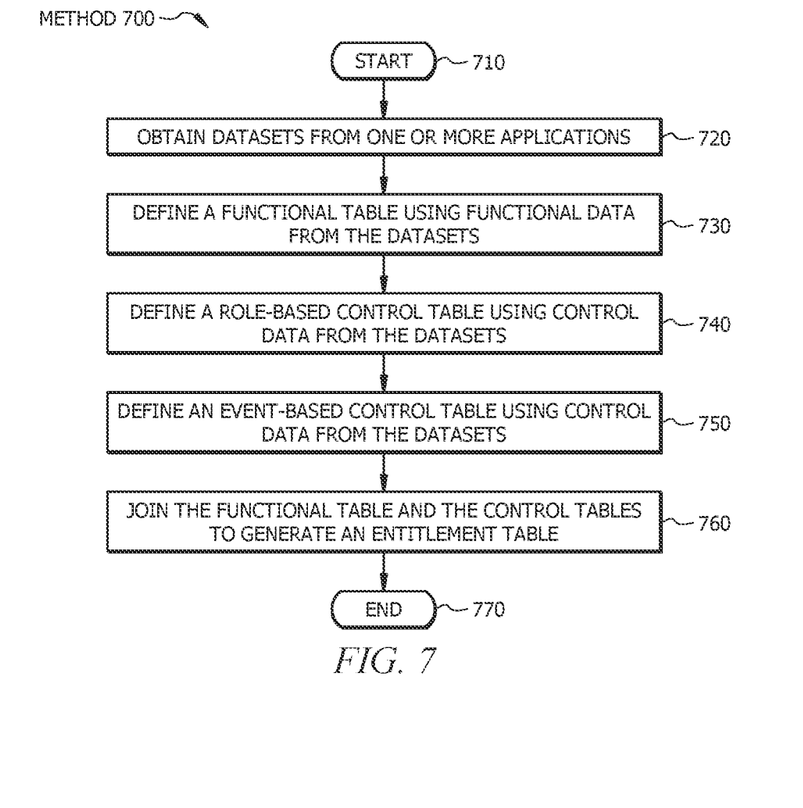
FIG. 7 illustrates an example method for generating functional tables and control tables, in accordance with certain embodiments.

FIG. 7 illustrates a method 700 for generating functional tables and control tables, in accordance with certain embodiments. Method 700 begins at step 710. At step 720 of method 700, a data lake obtains datasets from one or more applications. For example, referring to FIG. 1, data lake 150 may obtain datasets 132 from one or more applications 122 associated with data providers 120. Data lake may receive the datasets via one or more push APIs associated with the one or more applications, via one or more locations shared with the one or more applications, from one or more data stores associated with the one or more applications via a stream, etc. Method 700 then moves from step 720 to step 730.

At step 730 of method 700, the data lake defines a functional table using functional data from the datasets. For example, referring to FIG. 2, data lake 150 may define functional table 152a using functional data from datasets. The functional table may include a column identifying a plurality of keys, a column identifying a plurality of events associated with the plurality of keys, a column identifying a plurality of divisions associated with the plurality of events (as illustrated in functional table 152b of FIG. 3), and so on. Method 700 then moves from step 730 to step 740.

At step 740 of method 700, the data lake defines a role-based control table using control data from the datasets. For example, referring to FIG. 4, the data lake may define role-based control table 154c using control data from datasets. The role-based control table may map a plurality of users to a plurality of roles and associated attributes. The attributes may be related to divisions, business lines, events, geographical indicators, and the like. In certain embodiments, the role-based control table maps the plurality of users to the associated attributes in accordance with one or more rules. Method 700 then moves from step 740 to step 750.

At step 750 of method 700, the data lake defines an event-based control table using control data from the datasets. For example, referring to FIG. 5, the data lake may define event-based control table 154d using control data from datasets. The event-based control table may map a plurality of events to a plurality of associated attributes. The attributes may be related to divisions, business lines, events, geographical indicators, sensitive data indicators, sensitive data flag indicators, and the like. In certain embodiments, the event-based control table maps the plurality of events to the associated attributes in accordance with one or more rules. Method 700 then moves from step 750 to step 760.

At step 760 of method 700, the data lake joins the functional table and the one or more control tables based to generate an entitlement table. For example, referring to FIG. 2, the data lake may join datasets from functional table 152a and control table 154a and filter records for user 192a to generate entitlement table 158a. As another example, referring to FIG. 3, the data lake may join datasets from functional table 152b and control table 154b and filter records for user 192a to generate entitlement table 158b.

In certain embodiments, the entitlement table includes one or more row-level entitlements. Entitlements represent rights to use, access and/or consume certain types of data. Entitlements may be governed by one or more rules. Method 700 then moves from steps 760 and 770, where method 700 ends. As such, method 700 may be used to centrally collate data from across divisions and share entitled data with different divisions/teams.

Although this disclosure describes and illustrates particular steps method 700 of FIG. 7 as occurring in a particular order, this disclosure contemplates any suitable steps of method 700 of FIG. 7 occurring in any suitable order. Although this disclosure describes and illustrates an example method for generating functional tables and control tables including the particular steps of the method of FIG. 7, this disclosure contemplates any suitable method for generating functional tables and control tables including any suitable steps, which may include all, some, or none of the steps of the method of FIG. 7, where appropriate. Furthermore, although FIG. 7 describes and illustrates particular components, devices, or systems carrying out particular actions, this disclosure contemplates any suitable combination of any suitable components, devices, or systems carrying out any suitable actions.

Figure 8:
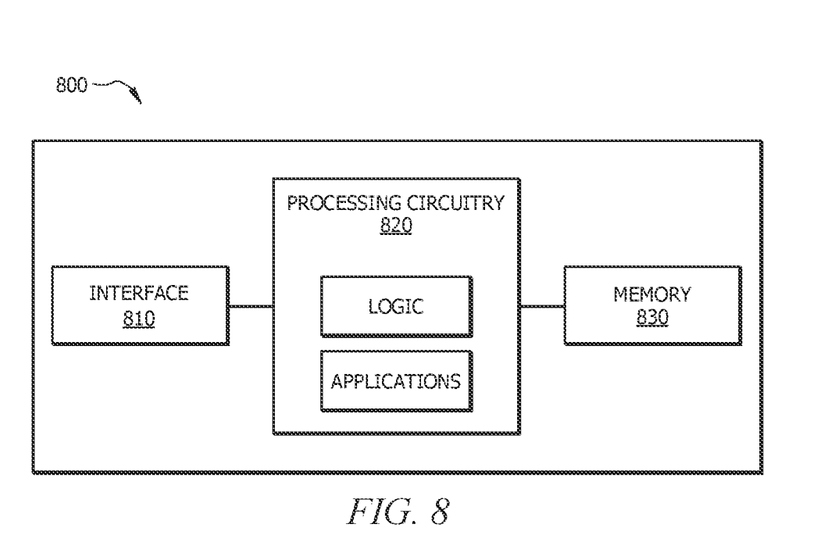
FIG. 8 illustrates an example computer system that may be used by the systems and methods described herein, in accordance with certain embodiments.

FIG. 8 illustrates a computer system 800 that may be used by the systems and methods described herein, in accordance with certain embodiments. For example, one or more components of system 100 of FIG. 1 may include one or more interface(s) 810, processing circuitry 820, memory (ies) 830, and/or other suitable element(s). Interface 810) receives input, sends output, processes the input and/or output, and/or performs other suitable operation. Interface 810 may include hardware and/or software.

Processing circuitry 820 performs or manages the operations of the component. Processing circuitry 820 may include hardware and/or software. Examples of a processing circuitry include one or more computers, one or more microprocessors, one or more applications, etc. In certain embodiments, processing circuitry 820 executes logic (e.g., instructions) to perform actions (e.g., operations), such as generating output from input. The logic executed by processing circuitry 820 may be encoded in one or more tangible, non-transitory computer readable media (such as memory 830). For example, the logic may include a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 830 (or memory unit) stores information. Memory 830 may include one or more non-transitory, tangible, computer-readable, and/or computer-executable storage media. Examples of memory 830 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. One or more computer-readable non-transitory storage media embodying instructions that, when executed by a processor, cause the processor to perform operations comprising:

democratizing sensitive data by importing and co-locating datasets comprising the sensitive data from one or more applications associated with multiple domains within an organization, wherein the datasets comprise functional data and control data related to a plurality of events;

identifying event classifications based on the plurality of events;

defining a functional table using the functional data and by mapping a plurality of keys to the event classifications;

defining a control table using the control data and by mapping one or more of the plurality of keys to each of a plurality of users;

joining the functional table and the control table to generate an entitlement table by using the plurality of keys to join the functional table and the control table; and generating a secured view based on the entitlement table, wherein the secured view prevents unauthorized disclosure of the sensitive data.

2. The one or more computer-readable non-transitory storage media of claim 1, wherein the control table is a role-based control table, the role-based control table comprising one or more of the following fields:
a first field indicating the plurality of users;
a second filed indicating a plurality of roles associated with the plurality of users;
a third field indicating one or more divisions associated with one or more of the plurality of users;
a fourth field indicating one or more business lines associated with one or more of the plurality of users;
a fifth field indicating one or more events associated with one or more of the plurality of users; and
a sixth field indicating a geographical location associated with one or more of the plurality of users.

3. The one or more computer-readable non-transitory storage media of claim 1, wherein the control table is an event-based control table, the event-based control table comprising one or more of the following fields:
a first field indicating the plurality of events;
a second field indicating one or more divisions associated with one or more of the plurality of events;
a third field indicating one or more business lines associated with one or more of the plurality of events;
a fourth field indicating a geographical location associated with one or more of the plurality of events;
a fifth field indicating whether one or more of the plurality of events comprises sensitive information; and
a sixth field indicating whether one or more of the plurality of events comprises a sensitive flag.

4. The one or more computer-readable non-transitory storage media of claim 1, wherein:
the one or more applications comprise a plurality of applications;
each of the datasets is associated with a respective application of the plurality of applications; and
each of the plurality of applications is associated with a different data store.

5. The one or more computer-readable non-transitory storage media of claim 1, the operations further comprising:
communicating the secured view to a user.

6. The one or more computer-readable non-transitory storage media of claim 5, the operations further comprising:
receiving a request from the user to access a portion of the sensitive data related to a specified event of the plurality of events;
identifying a role of the user;
identifying a role-based entitlement of the user based on the role of the user;
determining, using the role-based entitlement of the user, a user entitlement; and
generating the secured view associated with the user entitlement based on the entitlement table.

7. The one or more computer-readable non-transitory storage media of claim 5, wherein the entitlement table filters out entitlements based on an identity of the user.

8. The one or more computer-readable non-transitory storage media of claim 5, wherein the secured view comprises the entitlement table but not the functional table or the control table.

9. The one or more computer-readable non-transitory storage media of claim 5, wherein the secured view prevents the user from being exposed to unentitled data provided in the functional table.

10. A method, comprising:
democratizing sensitive data by importing and co-locating datasets comprising the sensitive data from one or more applications associated with multiple domains within an organization, wherein the datasets comprise functional data and control data related to a plurality of events;
identifying event classifications based on the plurality of events;
defining a functional table using the functional data and by mapping a plurality of keys to the event classifications;
defining a control table using the control data and by mapping one or more of the plurality of keys to each of a plurality of users;
joining the functional table and the control table to generate an entitlement table by using the plurality of keys to join the functional table and the control table; and
generating a secured view based on the entitlement table, wherein the secured view prevents unauthorized disclosure of the sensitive data.

11. The method of claim 10, wherein importing the datasets from the one or more applications comprises:
receiving the datasets via one or more push application programming interfaces (APIs) associated with the one or more applications;
receiving the datasets via one or more locations shared with the one or more applications; or
receiving the datasets from one or more data stores associated with the one or more applications via a stream.

12. The method of claim 10, wherein:
the one or more applications comprise a plurality of applications;
each of the datasets is associated with a respective application of the plurality of applications; and
each of the plurality of applications is associated with a different data store.

13. The method of claim 10, wherein defining the control table using the control data comprises:
identifying one or more rules; and
applying the one or more rules to the functional data.

14. The method of claim 10, further comprising:
communicating the secured view to a user.

15. The method of claim 14, further comprising:
receiving a request from the user to access a portion of the sensitive data related to a specified event of the plurality of events;
identifying a role of the user;
identifying a role-based entitlement of the user based on the role of the user;
determining, using the role-based entitlement of the user, a user entitlement; and
generating the secured view associated with the user entitlement based on the entitlement table.

16. The method of claim 14, wherein the entitlement table filters out entitlements based on an identity of the user.

17. The method of claim 14, wherein the secured view comprises the entitlement table but not the functional table or the control table.

18. The method of claim 14, wherein the secured view prevents the user from being exposed to unentitled data provided in the functional table.

* * * * *